United States Patent Office 3,468,859
Patented Sept. 23, 1969

3,468,859
PROCESS FOR PRODUCING VINYL CHLORIDE/
ETHYLENE AND VINYL CHLORIDE/PROPYL-
ENE COPOLYMERS
Richard E. Davies, Ridgewood, N.J., assignor to Air Reduction Company, Incorporated, New York, N.Y., a corporation of New York
No Drawing. Filed May 27, 1965, Ser. No. 459,446
Int. Cl. C08f 15/02
U.S. Cl. 260—87.5                                 8 Claims

ABSTRACT OF THE DISCLOSURE

Copolymers of vinyl chloride with a minor amount of an olefin, which may be propylene or ethylene, which have an increased melt flow value in relation to intrinsic viscosity and olefin content are prepared by polymerizing vinyl chloride with the olefin in the presence of a free-radical catalyst at a temperature of about 30° to about 50° C. for an initial polymerization period of about 5 hours to about 20 hours and continuing the polymerization at a second-stage polymerization temperature of about 50° C. to about 75° C. for a second-stage polymerization period of about 1 hour to about 20 hours, the polymerization temperature in the second-stage being at least 8° higher than the temperature in the first stage.

---

The present invention is concerned with rigid resinous compositions for hot molding, extrusion, thermoforming and other hot shaping operations, which compositions have improved physical properties and processing characteristics, and the invention is more particularly concerned with a method of preparing polymers comprising vinyl chloride and ethylene or propylene for providing such rigid resinous compositions.

In copending application Ser. No. 390,416 of Heiberger et al., now abandoned filed Aug. 18, 1964, there are described rigid resinous compositions based upon polymers comprising vinyl chloride and ethylene, i.e. polymers produced by the polymerization of vinyl chloride in the presence of ethylene, and in copending application Ser. No. 422,619 of Heiberger et al., filed Dec. 31, 1964, there are described rigid resinous compositions based upon polymers comprising vinyl chloride and propylene. The above-mentioned polymers, which will be referred to for convenience as vinyl chloride-ethylene copolymers and vinyl chloride-propylene copolymers, respectively, are characterized by a specific combination of ethylene or propylene content, intrinsic viscosity and melt flow characteristics. These copolymers are described in the above-mentioned applications as being suitably prepared by polymerization techniques using free radical catalysts, and in some cases catalysts of the redox type, or redox catalyst components.

It is an object of the present invention to provide a polymerization process of the character indicated for making vinyl chloride-ethylene copolymers and vinyl chloride-propylene copolymers, which makes possible a favorable shifting of the melt flow values of the copolymers in relation to their intrinsic viscosity and olefin content values.

It is another object of this invention to provide improved and novel processes and procedures for the preparation of vinyl chloride polymeric materials.

In accordance with this invention, polymeric materials are prepared from vinyl chloride and olefins such as ethylene and propylene by a process which involves a two-stage or two-step temperature controlled polymerization operation. In general, the vinyl chloride-olefin monomeric mixture is polymerized at a controlled initial polymerization temperature, and after polymerization at this initial temperature, the temperature of the polymerization system is increased or raised to a second temperature, and further polymerization is then conducted at this second temperature which is maintained at a value higher than the initial polymerization temperature.

The two-stage polymerization process of this invention makes possible the preparation of polymeric materials, e.g. vinyl chloride-ethylene copolymers and vinyl chloride-propylene copolymers, which show marked improvement over polymeric materials of similar composition and intrinsic viscosity which are produced by a single-stage process. Not only is this in itself an important feature of the process of the invention, but it can be achieved with a simultaneous increase in yield in comparison with the preparation of polymeric products of similar composition and intrinsic viscosity by the conventional one-stage polymerization process, using the same overall time, initial temperature, and catalyst.

A further advantage of this method is that the foregoing results are obtained while substantially fully maintaining the other desirable properties of the copolymers, such as their heat stability.

The foregoing features and advantages are illustrated by the comparative data set forth in the following tables.

TABLE 1.—VINYL CHLORIDE-PROPYLENE COPOLYMERS, PROCESS DATA

| Example No. | Type | Monomers Charged (parts by weight) | | Initial polymerization temp., °C. | Initial polymerization period (hours) | Second stage polymerization temp., °C. | Second stage polymerization period (hours) | Yield, percent | Copolymer product (percent by weight) | |
|---|---|---|---|---|---|---|---|---|---|---|
| | | Vinyl chloride | Propylene | | | | | | Vinyl chloride | Propylene |
| 1 | 2-stage | 90 | 10 | 45 | 10.0 | 65 | 10.5 | 78 | 96.4 | 3.6 |
| 2 | 1-stage | 90 | 10 | 45 | 22 | | | 59 | 96.7 | 3.3 |
| 3 | 2-stage | 90 | 10 | 50 | 18.0 | 70 | 4 | 78 | 96.3 | 3.7 |

TABLE 2.—VINYL CHLORIDE-PROPYLENE COPOLYMERS, PRODUCT DATA

| Example No. | Specific gravity | Intrinsic viscosity | Melt flow (dg./min.) | $T_i$, °C. | $T_4$, °C. | Thermal stability |
|---|---|---|---|---|---|---|
| 1 | 1.374 | 0.65 | 25.7 | 70.3 | 76.9 | 35 |
| 2 | 1.375 | 0.63 | 13.1 | 72.0 | 77.0 | 40 |
| 3 | 1.376 | 0.63 | 23.2 | 70.7 | 76.7 | 45 |

TABLE 3.—VINYL CHLORIDE-PROPYLENE COPOLYMERS, PROCESS DATA

| Ex. No. | Type | Monomers charged (parts by weight) | | Initial polymerization temp., °C. | Initial polymerization period (hours) | Second stage polymerization temp., °C. | Second stage polymerization period (hours) | Yield, percent | Copolymer product (percent by weight) | |
|---|---|---|---|---|---|---|---|---|---|---|
| | | Vinyl chloride | Propylene | | | | | | Vinyl chloride | Propylene |
| 4 | 2-stage | 85 | 15 | 40 | 12.5 | 60 | 10.0 | 86 | 95.5 | 4.5 |
| 5 | 2-stage | 85 | 15 | 40 | 15.0 | 60 | 7.5 | 73 | 95.0 | 5.0 |
| 6 | 1-stage | 85 | 15 | 48 | 22 | | | 52 | 95.5 | 4.5 |

TABLE 4.—VINYL CHLORIDE-PROPYLENE COPOLYMERS, PRODUCT DATA

| Ex. No. | Specific gravity | Intrinsic viscosity | Melt flow (dg./min.) | $T_f$, °C. | $T_4$, °C. | Thermal stability |
|---|---|---|---|---|---|---|
| 4 | 1.365 | 0.62 | 95.0 | 67.5 | 74.7 | 40 |
| 5 | 1.363 | 0.58 | 91.6 | 67.7 | 74.2 | 40 |
| 6 | 1.366 | 0.64 | 40.2 | 62.5 | 68.8 | 45 |

TABLE 5.—VINYL CHLORIDE-PROPYLENE COPOLYMERS, PROCESS DATA

| Ex. No. | Type | Monomers charged (parts by weight) | | Initial polymerization temp., °C. | Initial polymerization period (hours) | Second stage polymerization temp., °C. | Second stage polymerization period (hours) | Yield, percent | Copolymer product (percent by weight) | |
|---|---|---|---|---|---|---|---|---|---|---|
| | | Vinyl chloride | Propylene | | | | | | Vinyl chloride | Propylene |
| 7 | 2-stage | 90 | 10 | 45 | 18.0 | 65 | 4.5 | 95 | 96.4 | 3.6 |
| 8 | 2-stage | 90 | 10 | 40 | 18.0 | 70 | 4.5 | 87 | 96.4 | 3.6 |
| 9 | 2-stage | 90 | 10 | 45 | 20.0 | 70 | 2.5 | 77 | 97.0 | 3.0 |

TABLE 6.—VINYL CHLORIDE-PROPYLENE COPOLYMERS, PRODUCT DATA

| Ex. No. | Specific gravity | Intrinsic viscosity | Melt flow (dg./min.) | $T_f$, °C. | $T_4$, °C. | Thermal stability |
|---|---|---|---|---|---|---|
| 7 | 1.376 | 0.75 | 9.0 | 72.0 | 78.2 | 35 |
| 8 | 1.378 | 0.75 | 5.4 | 72.1 | 78.0 | 35 |
| 9 | 1.376 | 0.76 | 8.9 | 70.0 | 76.9 | 40 |
| 10 [1] | 1.377 | 0.75 | 4.0 | | | |

[1] This product was prepared by comparable one-stage temperature polymerization at about 45° C., the product being obtained in a yield less than 75%.

TABLE 7.—VINYL CHLORIDE-ETHYLENE COPOLYMERS, PROCESS DATA

| Ex. No. | Type | Monomers charged (parts by weight) | | Initial polymerization temp., °C. | Initial polymerization period (hours) | Second stage polymerization temp., °C. | Second stage polymerization period (hours) | Yield, percent | Copolymer product (percent by weight) | |
|---|---|---|---|---|---|---|---|---|---|---|
| | | Vinyl chloride | Ethylene | | | | | | Vinyl chloride | Ethylene |
| 11 | 2-stage | 90 | 10 | 40 | 15.0 | 60 | 7.5 | 100 | 97.7 | 2.3 |
| 12 | 1-stage | 95 | 5 | 55 | 20.0 | | | 90 | 96.0 | 4.0 |
| 13 | 2-stage | 85 | 15 | 50 | 6.0 | 65 | 16 | 89 | 96.8 | 3.2 |
| 14 | 1-stage | 90 | 10 | 50 | 21.0 | | | 55 | 97.0 | 3.0 |

TABLE 8.—VINYL CHLORIDE-ETHYLENE COPOLYMERS, PRODUCT DATA

| Ex. No. | Specific Gravity | Intrinsic viscosity | Melt flow (dg./min.) | $T_f$, °C. | $T_4$, °C. | Thermal stability |
|---|---|---|---|---|---|---|
| 11 | 1.386 | 1.16 | 0.16 | 68.0 | 76.2 | 35 |
| 12 | | 1.1 | 0.03 | 69.0 | 76.0 | [1] 35 |
| 13 | 1.378 | 0.92 | 2.9 | [1] 68 | [1] 75 | 35 |
| 14 | | 0.98 | 0.3 | 73.0 | 80 | [1] 35 |

[1] Approximate.

The foregoing examples are given for illustrative purposes only and are in no way limitative of the invention which will be further described below in relation to other embodiments and in more specific detail.

The first stage of the multistage or multistep polymerization process can generally be conducted at an initial polymerization temperature within the range of from about 30° C. to about 50° C.; and the second stage polymerization can generally be conducted at a temperature within the range of about 50° C. to about 75° C. It is preferred that the second stage polymerization temperature be at least about 8° C. higher than the first stage polymerization temperature or the initial polymerization temperature. More preferably the increase in temperature in the second stage over the first stage should be within the range of about 13° C. to 30° C.

In general, the two-stage polymerization process of this invention is conducted at the first-stage polymerization temperature for an initial polymerization period of from about 5 hours to about 20 hours, and the second-stage polymerization is conducted at the second polymerization temperature for a polymerization period of from about 1 hour to 20 hours. While improvement can be obtained when the second-stage polymerization time is as little as 1/20 of the overall polymerization time, to achieve the significant improvements which are obtainable in accordance with this invention, the second-stage polymerization time is preferably at least ¼ of the overall polymerization time, but should not exceed about 3 times the first-stage polymerization time. More preferably, the ratio of the second-stage polymerization period to the first-stage polymerization period should be within the range of about 1:2 to about 1.5:1.

The improved and novel process of this invention is applicable to the preparation of vinyl chloride polymeric materials consisting mainly of vinyl chloride units and containing up to about 20% by weight of one or more other monomeric material units. The other monomeric materials to be polymerized with vinyl chloride are suitably ethylene and propylene. The process of this invention is especially applicable to the preparation of vinyl chloride-ethylene copolymers and vinyl chloride-propylene copolymers. Vinyl chloride copolymeric materials containing from about 85% to about 99.5% by weight of vinyl chloride units and from about 0.5% to about 15% by weight of ethylene units, and from about 90% to about 99.5% by weight of vinyl chloride units and from about 0.5% to about 10% by weight of propylene units, are especially advantageously prepared utilizing the procedures of this invention.

By the process of this invention, vinyl chloride-ethylene copolymers and vinyl chloride-propylene copolymers can be effectively produced without the use of high pressures or elevated temperatures, and thus can be carried out in relatively inexpensive, conventional polymerization equipment. Canadian Patent No. 674,142 dated Nov. 12, 1963, described a process for making vinyl chloride-ethylene copolymers containing a very minor amount of ethylene, e.g. a maximum of less than 5%, but the process of the Canadian patent is characterized by the use of extremely high pressures, e.g. pressures of at least 20,000 pounds per square inch, so that very special, expensive, equipment is required for carrying out that process. I have discovered that, surprisingly, the copolymers of the character indicated can be produced at the relatively low pressure of 100 to 1000 pounds per square inch, and it is not necessary to elevate the temperature of polymerization.

The two-stage process for preparing vinyl chloride polymeric materials is applicable to the known polymerization techniques using free-radical catalysts or free-radical initiators. These prior art polymerization techniques include suspension, emulsion, solution, and mass or bulk polymerization techniques. However, it has been found that the suspension polymerization techniques are especially advantageous to prepare vinyl chloride polymers utilizing the improved two-stage process of this invention.

The suspension or bead polymerization techniques involve the copolymerization of the monomer mixture in an aqueous system with continuous agitation of the polymerization system. Generally, these techniques involve introducing the desired quantities of monomers to be copolymerized into a suitable reaction vessel or suitable polymerization vessel containing sufficient water to provide appropriate suspension polymerization conditions. The amount of water used may be varied to accommodate the various components of the suspension system and to maintain the copolymer product in suspension during the polymerization. Ordinarily, the weight ratio of water to total amount of monomers charged is within the range from about 2:1 up to about 4:1 or higher. Generally an autoclave or a pressure polymerization vessel is utilized and the copolymerization results in polymerization system pressures up to about 1000 pounds per square inch.

In carrying out the polymerization procedures the aqueous suspension system is first prepared in the reaction vessel, or in any other suitable vessel and then added to the reaction vessel. This aqueous system contains the desired quantity of water with respect to the total amount of monomers to be charged during the polymerization and also contains a small amount of suspending agent normally used in suspension polymerization techniques. The aqueous suspension system may also contain a small amount of a wetting agent and may also contain a small amount of an alkaline buffering material for maintaining the pH of the polymerization system at a desired value during the polymerization reaction. To the aqueous system in the polymerization vessel there is added the desired amount of polymerization catalyst or polymerization initiator. The vessel is then closed or sealed and pressure checked or pressure tested with nitrogen. The polymerization vessel is then purged first with nitrogen and then with vinyl chloride. The monomer mixture consisting of the desired quantities of vinyl chloride and ethylene or vinyl chloride and propylene are charged to the polymerization vessel while the reaction system is being agitated. The monomers may be fed to the reaction vessel separately or as a mixture. Agitation of the aqueous system is continued through the polymerization periods. The polymerization reaction system is then heated to the initial polymerization temperature or first-stage temperature and the system is maintained at this initial temperature for a given period of time. At the end of the first-stage polymerization period, the temperature of the polymerization system is increased to the second-stage polymerization temperature. The polymerization system is maintained at the second temperature for a given period. At the end of the second-stage polymerization, the polymerization vessel is vented and agitation is discontinued and the vessel contents are removed and filtered to recover the copolymer product. The copolymer product is then subjected to conventional washing and drying operations.

One or more of the monomers may be added in increments during the polymerization, instead of being added entirely at one time. It is generally desirable that free vinyl chloride monomer always be present in the polymerization system during the time the polymerization is being carried out.

The suspending agents used in preparing the aqueous suspension system are those agents conventionally used for the suspension polymerization of vinyl chloride. For example, they include, partially-acetylated polyvinyl alcohol, methyl cellulose, hydroxyethyl celluose, gelatin, and sodium or magnesium lauryl sulfate. Particularly advantageous are the methyl celluloses, hydroxyethyl celluloses, and the partially-acetylated polyvinyl alcohols. When using a polyvinyl alcohol as the suspending agent, it is preferred to utilize a partially-acetylated polyvinyl alcohol or a partially-hydrolyzed polyvinyl alcohol having a degree of hydrolysis of about 86%. These partially-acetylated polyvinyl alcohols should also be of the medium viscosity type, that is, a 4% aqueous solution of the polyvinyl alcohol at 20° C. should have a viscosity of about 30 centiposes to about 50 centipoises.

The quantity of suspending agent utilized in the aqueous system can vary over wide ranges, but most suitably the amount used is from about 0.01% to about 0.5% by weight of the total weight of the monomers to be charged to the aqueous polymerization system, preferably about 0.02% to about 0.2% by weight is used.

Free radical polymerization catalysts or initiators are used in the copolymerization techniques of this invention, and include generally the oil-soluble free redical polymerization initiators, as organic peroxides and azo compounds. For example, lauroyl peroxide, tert-butyl peroxy pivalate, 2,4-dichlorobenzoyl peroxide, benzoyl peroxide, capryloyl per oxide, diisopropyl peroxydicarbonate, $\alpha,\alpha'$-azodiisobutyronitrile, and similar azo compounds such as those discussed and disclosed in Hunt U.S. Patent No. 2,471,959. Also useful is the combination of a water-soluble promoter, such as sodium bisulfite, with an oil-soluble free radical catalyst. The quantity of polymerization catalyst used can vary over wide ranges, but best results are usually obtained using an amount of catalyst that is within the range of about 0.01% to about 2% by weight based on the total weight of the monomers charged; preferably the amount of catalyst used is about .005% to about 0.5% by weight of the total monomer mixture.

The aqueous suspension polymerization system may also include a surface-active agent or wetting agent in an amount of about 0.001% to about 1% by weiyht of the total monomer mixture, preferably 0.005% to about 0.5% by weight is used. Generally, the wetting agent is added to the aqueous system as a water solution. Any of the well known and conventional wetting agents used in aqueous suspension polymerization techniques for vinyl chloride may be used; a preferred wetting agent is sodium di-octyl sulfosuccinate, sold commercially as "Aerosol-OT."

As indicated, the aqueous suspension system may also include an alkaline buffering agent to maintain the pH of the system at a desired value during the copolymerization. Generally any alkaline material that is compatible with the other materials in the suspension system can be used as a buffer. Ammonium bicarbonate and sodium bicarbonate are preferred buffers because of their excellent compatibility with the system components and their low cost; however, other buffering agents as disodium phosphate, sodium acetate, and similar compounds may also be used. When superior electrical properties are desired in the copolymer product, it is preferred to use a nonmetallic buffer, such as ammonium bicarbonate. The amount of buffer to be used will vary depending upon the desired pH of the suspension system to be maintained. In most cases, the amount of buffer used is within the range of about 0.1% to about 0.5% by weight based on the total weight of the monomers charged.

The ratio between the weight of vinyl chloride monomer charged and ethylene monomer charged or propylene monomer charged will vary depending on the desired copolymer characteristics. As previously indicated, vinyl chloride copolymers containing from about 85% to about 99.5% by weight of vinyl chloride units and from about 0.5% to about 15% by weight of ethylene or 0.5% to 10% by weight of propylene units are advantageously prepared utilizing the improved procedures of this invention. In general, the copolymer product characteristics or the amount of ethylene or propylene in the vinyl chloride copolymer product is controlled or depends on the ratio of the monomers present in the monomer mixture charged to the polymerization system. Generally, because of the reactivity differences between the monomers the weight percent of vinyl chloride in the finished copolymer product will be higher than the weight percentage of the vinyl chloride in the monomer mixture charged. Therefore, it is necessary generally to provide in the monomer mixture charged an amount of ethylene or propylene in excess of that amount desired in the finished copolymer. Generally, the amount of ethylene or propylene in the charged monomer mixture is such that the ethylene or propylene is present in an amount of at least about 100% over that amount of ethylene or propylene required to produce the desired copolymer product composition.

As indicated previously, solution polymerization techniques, emulsion polymerization techniques, and bulk polymerization techniques may also be used in the procedures and methods of this invention to prepare vinyl chloride-ethylene copolymers and vinyl chloride-propylene copolymers. It is preferred to prepare the vinyl chloride copolymer by the previously described suspension or bead polymerization techniques.

The following examples are further illustrative of the novel concepts, procedures and techniques of this invention, and are not intended to limit the scope or area of this invention. In the examples, all parts are parts by weight, unless otherwise indicated.

In the following examples, as in Examples 1–14, the percent yield figures are based on the amount of vinyl chloride monomer charged to the copolymerization system and the amount of vinyl chloride present in the copolymer product. The vinyl chloride content of the product copolymer was determined by chlorine analysis, utilizing sodium fusion in a Parr Bomb followed by electrometric titration. The ethylene or propylene content of the product copolymers were calculated from the obtained values for vinyl chloride. Standard measurement techniques were utilized to determine the amount of vinyl chloride or ethylene or propylene in the total monomer mixture charged. The intrinsic viscosity values are given in deciliters per gram (dl./g.), and were obtained in the conventional manner by measurement of the reduced viscosity values of several dilute solutions of the copolymer product in cyclohexanone at a temperature of 25° C. A typical procedure is described in ASTM, D1243–60, Method A. In evaluating other copolymer properties the copolymer products were mixed with an organic tin mercaptide stabilizer (Advastab T–360) to provide a molding composition containing 3 parts by weight of stabilizer per 100 parts by weight of copolymer. This molding composition was utilized to prepare molded samples for the various tests.

For example, specific gravity values were obtained by measurement of the molded composition using ASTM method D792–60T. The heat stability of the molded samples was determined by placing the sample in an air oven maintained at 400° F. and recording the time, in minutes, required for the sample to turn black. The change to a black color occurs relatively suddenly and there is no appreciable transition time involved in color changes of the sample before it turns black. The melt flow values were determined by means of ASTM, D1238–57T, Condition F. The apparent modulus of elasticity was determined by means of ASTM, D1043–61T, and the results are expressed as $T_f$ and $T_4$ in degrees centigrade, and where $T_f$ is the temperature at which the modulus of elasticity of the molded sample is 135,000 p.s.i., and $T_4$ is the temperature at which the modulus of elasticity of the molded sample is 10,000 p.s.i. As is known in the art, the $T_f$ values correspond approximately to the heat distortion temperatures of the sample.

EXAMPLE 15

An aqueous suspension system was prepared by adding 0.6 part by weight of methyl cellulose (Methocel 90HG 100 cps.) to 1200 parts by weight of water at 80° C. with agitation. The resulting suspension was continuously agitated and cooled to room temperature and 15 parts by weight of sodium di-octyl sulfosuccinate was added (0.75% aqueous solution of Aerosol-OT). The aqueous suspension system was then charged to a stainless steel jacketed autoclave having a single blade propellor agitator. 1.5 parts of tert-butyl peroxy pivalate were added to the reaction vessel. The reaction vessel was sealed and pressure tested and was charged with nitrogen and vinyl chloride. 360 parts by weight of vinyl chloride was added to the reaction vessel and 96 parts by weight of propylene was added to the reaction vessel. The copolymerization system was then heated to an initial reaction temperature of 45° C. and maintained at the initial reaction temperature for 13.5 hours. At the end of the 13.5 hours period the copolymerization system was heated to a second stage temperature of 50° C. and maintained at 50° C. for 8.5 hours. The reaction vessel was then vented and the copolymer product was recovered from the reaction system by filtration. The copolymer product was washed and dried and 320 parts by weight of copolymer product were obtained. The copolymer had a chlorine content of 55% corresponding to a vinyl chloride content of 96.9% by weight and 3.1% by weight of propylene. The yield was 85% and the specific gravity of the copolymer was 1.362. The intrinsic viscosity of the copolymer was 0.59.

Molded samples of the copolymer containing 3 parts of stabilizer per 100 parts of copolymer had a melt flow value of 79.5° C. dg./min.; the $T_f$ value was 68.5° C. and the $T_4$ value was 74.9° C. The heat or thermal stability was 40 minutes.

EXAMPLE 16

Utilizing procedures similar to those used in Example 15, a vinyl chloride-ethylene copolymer was prepared. The reaction system consisted of 1200 parts water, 0.6 part methyl cellulose, 15 parts sodium di-octyl sulfosuccinate, 360 parts vinyl chloride, 36 parts ethylene and 1.5 parts tert-butyl peroxy pivalate. The initial polymerization temperature was maintained at 40° C. for 15 hours and the second stage polymerization temperature was maintained at 60° C. for 7.5 hours. 350 parts by weight of copolymer product was obtained corresponding to a yield of 100%. The copolymer contained 97.7% by weight of vinyl chloride and 2.3% by weight ethylene. Intrinsic viscosity was 1.16 and specific gravity was 1.386. Melt flow value was 0.16 dg./min. and $T_f$ was 68° C., while $T_4$ was 76.2° C. Thermal stability was 35 minutes.

Utilizing the procedures described in Example 15, a series of vinyl chloride-propylene copolymers were prepared. In the following Table 9 and Table 10 there is summarized a description of these runs, and the copolymer characteristics produced by these runs. All runs were conducted using the two-stage polymerization process, except Example 23 which was a single-stage copolymerization conducted at a constant temperature. This single temperature run is for purposes of comparison.

like, alone or in combination. The function of various stabilizers in such polymers is well known and is de-

TABLE 9.—VINYL CHLORIDE-PROPYLENE COPOLYMERS, PROCESS DATA

| Ex. No. | Monomers charged (parts by weight) | | Initial polymerization temp., °C. | Initial polymerization period (hours) | Second stage polymerization temp., °C. | Second stage polymerization period (hours) | Yield, percent | Copolymer product (percent by weight) | |
|---|---|---|---|---|---|---|---|---|---|
| | Vinyl chloride | Propylene | | | | | | Vinyl chloride | Propylene |
| 17 | 90 | 10 | 40 | 20.0 | 70 | 2.5 | 86 | 95.8 | 4.2 |
| 18 | 90 | 10 | 40 | 21.0 | 70 | 5.1 | 82 | 96.2 | 3.8 |
| 19 | 90 | 10 | 45 | 10.0 | 70 | 12.5 | 95 | 95.6 | 4.4 |
| 20 | 90 | 10 | 50 | 15.0 | 65 | 7.5 | 100 | 96.2 | 3.8 |
| 21 | 90 | 10 | 50 | 10.0 | 70 | 12.5 | 77 | 96.0 | 4.0 |
| 22 | 85 | 15 | 45 | 12.0 | 60 | 8.5 | 71 | 96.9 | 3.1 |
| 23 | 90 | 10 | 43 | 21 | | | 62 | 95.2 | 4.8 |

TABLE 10.—VINYL CHLORIDE-PROPYLENE COPOLYMER, PRODUCT DATA

| Ex. No. | Specific gravity | Intrinsic viscosity | Melt flow (dg./min.) | $T_f$, °C. | $T_4$, °C. | Thermal stability |
|---|---|---|---|---|---|---|
| 17 | 1.378 | 0.76 | 7.8 | 71.8 | 78.0 | 30 |
| 18 | 1.377 | 0.82 | 2.9 | 72.2 | 77.9 | 40 |
| 19 | 1.379 | 0.68 | 15.2 | 70.6 | 76.9 | 35 |
| 20 | 1.374 | 0.67 | 29.8 | 66.8 | 76.1 | 45 |
| 21 | 1.374 | 0.59 | 36.3 | 69.7 | 75.3 | 45 |
| 22 | 1.366 | 0.60 | 88.0 | 68.5 | 74.2 | 40 |
| 23 | 1.377 | 0.83 | 1.5 | 74.8 | 80.4 | 40 |

Utilizing the procedures described in Example 15, a series of vinyl chloride-ethylene copolymers were prepared. In the following Table 11 and Table 12 there is summarized a description of these runs and the copolymer characteristics produced by these runs. All runs were conducted using the two-stage polymerization process.

scribed, for example, in "Polymer Processes" by Schildknecht, pages 542–548. In general, any of the many stabilizers suitable for use with polyvinyl chloride may be employed. When the compositions are to be used for food packaging, or the like, the stabilizer and the other additives must be those which are approved for such use,

TABLE 11.—VINYL CHLORIDE/ETHYLENE, PROCESS DATA

| Ex. No. | Monomers charged (parts by weight) | | Initial polymerization temp., °C. | Initial polymerization period (hours) | Second stage polymerization temp., °C. | Second stage polymerization period (hours) | Yield percent | Copolymer product (percent by weight) | |
|---|---|---|---|---|---|---|---|---|---|
| | Vinyl chloride | Ethylene | | | | | | Vinyl chloride | Ethylene |
| 24 | 90 | 10 | 40 | 20.0 | 55 | 2.5 | 79.5 | 96.5 | 3.5 |
| 25 | 90 | 10 | 40 | 20.0 | 60 | 2.5 | 79.0 | 96.6 | 3.4 |
| 26 | 90 | 10 | 45 | 6.0 | 60 | 16.0 | 94.0 | 97.7 | 2.3 |
| 27 | 90 | 10 | 47 | 6.0 | 69 | 16.0 | 97.0 | 97.0 | 3.0 |
| 28 | 85 | 15 | 45 | 6.0 | 60 | 16.0 | 84.0 | 97.0 | 3.0 |
| 29 | 85 | 15 | 40 | 6.0 | 60 | 16.0 | 77.0 | 96.7 | 3.3 |

TABLE 12.—VINYL CHLORIDE-ETHYLENE COPOLYMER, PRODUCT DATA

| Ex. No. | Specific gravity | Intrinsic viscosity | Melt flow (dg./min.) | $T_f$, °C. | $T_4$, °C. | Thermal stability |
|---|---|---|---|---|---|---|
| 24 | 1.378 | 1.03 | 0.13 | 71.7 | 77.8 | 45 |
| 25 | 1.387 | 1.19 | 0.19 | 68.0 | 75.8 | 35 |
| 26 | 1.387 | 0.87 | 1.2 | 69.0 | 74.9 | 35 |
| 27 | 1.387 | 0.90 | 1.7 | 67.7 | 73.9 | 30 |
| 28 | 1.377 | 0.84 | 2.9 | 61.6 | 69.2 | 30 |
| 29 | 1.375 | 0.81 | 5.4 | 60.0 | 68.0 | 25 |

As disclosed in copending applications Ser. Nos. 390,416 and 422,619, the vinyl chloride-ethylene and vinyl chloride-propylene copolymers are useful in the preparation of rigid resinous combinations by combining them with suitable stabilizers and lubricants, and they may also be compounded with fillers, pigments, and resin additives. The copolymers producible by the process of this invention are similarly useful. Conventional compounding agents of a type well-known in the polymer art, and particularly in connection with vinyl resins, are suitably used. For example, suitable stabilizers include the well-known alkyl tin thioglycollate (Thermolite 31), dioctyl tin dilaurate, basic lead carbonate, metal phenates such as zinc, lead, or tin phenate, and barium n-nonyl phenate, fatty acid soaps of lead, cadmium, barium, calcium, magnesium, and zinc, cadmium benzoate, triphenyl phosphite, mono-octyl diphenyl phosphite, di(epoxyethyl)-benzene, epoxidized fatty oils, manganous pyrophosphite, and the i.e. they must be nontoxic. Approved additives are well known and typical approved stabilizers, for example, are nontoxic stabilizers which include fatty acid soaps of metals of Group II of the Periodic Table having an atomic weight of less than 100, such as the calcium, magnesium, and zinc soaps of stearic, lauric, and ricinoleic acids, as well as the alkali metal soaps of fatty acids, and various wholly organic stabilizers.

In like manner, conventional lubricants, such as mineral oil, fatty acids, synthetic waxes of the fatty amide and ester types, octyl stearate and calcium stearate, are used. Polymer lubricants are referred to in Schildknecht, p. 685 et seq. The stabilizers or inhibitors and lubricants are used in varying quantities, such as described in the foregoing publication, depending upon the nature of the individual agent. For example, stabilizers are generally used in the amount of 0.5 to 5 percent by weight of the copolymer but the overriding criterion is the use of a small amount sufficient to effect the desired stabilization. The same considerations apply in the use of lubricants. In general, lubricants are used in amounts ranging from 0.1 to 1 percent or more by weight of the copolymer. In general, the vinyl chloride-ethylene and the vinyl chloride-propylene copolymers are suitably combined with 0.1 to 10 percent by weight of combined lubricant and stabilizer.

Other additives such as fillers, pigments, plasticizers, and resin additives, are optional and are suitably used in appropriate quantity to give desired properties in the final products, as disclosed in the above-mentioned copending applications.

Although of wider application, the process of this invention is particularly effective to produce vinyl chloride-ethylene copolymers and vinyl chloride-propylene copolymers having the combination of characteristics defined in copending applications Ser. Nos. 390,416 and 422,619, viz vinyl chloride-ethylene copolymers having an ethylene content of 2 to 10 percent by weight, an intrinsic viscosity of 0.5 to about 1.5 dl./g., a melt flow rate of at least 0.5 dg./min., and an apparent modulus of elasticity of at least 100,000 p.s.i. at a temperature within the range of about 40° C. to about 75° C., and vinyl chloride-propylene copolymers having a propylene content of 1 to 10 percent by weight, an intrinsic viscosity of 0.5 to about 1.5 dl./g., a melt flow rate of at least 0.1 dg./min., and an apparent modulus of elasticity of at least 100,000 p.s.i. at a maximum temperature within the range of about 65° C. to about 80° C. The significance of the method of this invention is that the melt flow rate can be increased for a given intrinsic viscosity and a given content of ethylene or propylene in the copolymer.

It will be apparent to those skilled in the art that various changes and modifications may be made in the embodiments described above without departing from the invention as defined in the appended claims. It is intended, therefore, that all matter contained in the foregoing description and in the drawings shall be interpreted as illustrative only and not as limitative of the invention.

I claim:
1. The method of preparing vinyl chloride copolymers which comprises copolymerizing vinyl chloride and a minor amount of a comonomer selected from the group consisting of ethylene and propylene in the presence of a free-radical polymerization catalyst at an initial polymerization temperature within the range of from about 30° C. to about 50° C. for an initial polymerization period of about from 5 hours to about 20 hours to form preliminary polymerization mass, and continuing said polymerization of said preliminary polymerization mass at a second-stage polymerization temperature within the range of from about 50° C. to about 75° C. and which is at least 8° C. higher than said initial polymerization temperature for a second-stage polymerization period of from about 1 hour to about 20 hours.

2. The method according to claim 1, wherein said comonomer is ethylene.

3. The method according to claim 1, wherein said comonomer is propylene.

4. The method of preparing vinyl chloride copolymers which comprises preparing an aqueous suspension polymerization system containing a suspending agent, a wetting agent, and a free-radical polymerization catalyst; adding vinyl chloride and a minor amount of a comonomer selected from the group consisting of ethylene and propylene to said aqueous suspension system; copolymerizing said vinyl chloride and said comonomer in said system at an initial temperature of from about 30° C. to about 50° C. for about 5 hours to about 20 hours to form a preliminary polymerization mass, and continuing said copolymerization of said preliminary polymerization mass at a second-stage copolymerization temperature of from about 50° C. to about 75° C. and which is at least 8° C. higher than said initial polymerization temperature for about 1 hour to about 20 hours.

5. The method according to claim 4, wherein said comonomer is ethylene.

6. The method according to claim 4, wherein said comonomer is propylene.

7. The method according to claim 4, wherein said vinyl chloride copolymer produced contains from about 85% to about 99.5% by weight of vinyl chloride units and from about 0.5% to about 15% by weight of comonomer units.

8. The method according to claim 4, wherein the suspending agent is methyl cellulose and the wetting agent is sodium di-octyl sulfosuccinate and the polymerization catalyst is tert-butyl peroxy pivalate.

References Cited
UNITED STATES PATENTS

| | | |
|---|---|---|
| 2,422,392 | 6/1947 | Brubaker et al. _____ 260—87.5 |
| 2,769,804 | 11/1956 | Hanson. |
| 2,868,762 | 1/1959 | Oakes. |

FOREIGN PATENTS

| | | |
|---|---|---|
| 641,679 | 8/1950 | Great Britain. |

JOSEPH L. SCHOFER, Primary Examiner

J. A. DONAHUE, Jr., Assistant Examiner

PO-1050
(5/69)

UNITED STATES PATENT OFFICE
CERTIFICATE OF CORRECTION

Patent No. 3,468,859  Dated September 23, 1969

Inventor(s) Richard E. Davies

It is certified that error appears in the above-identified patent and that said Letters Patent are hereby corrected as shown below:

Table 2, Col. 3, "0.65" should read -- 0.64 --.

Col. 5, line 38, "fram" should read -- from --;
line 66, "through" should read -- throughout --.

Col. 6, line 27, "centiposes" should read -- centipoises --;
line 36, "redical" should read -- radical --;
line 40, "per oxide" should read -- peroxide --;
line 54, "weiyht" should read -- weight --.

Col. 8, line 35, "hours" should read -- hour --;
line 62, "was" should read -- were --.

Col. 11, line 49, after "form" insert -- a --.

SIGNED AND
SEALED
MAY 19 1970

(SEAL)
Attest:

Edward M. Fletcher, Jr.
Attesting Officer

WILLIAM E. SCHUYLER, JR.
Commissioner of Patents